US008606937B2

United States Patent
Qian et al.

(10) Patent No.: US 8,606,937 B2
(45) Date of Patent: Dec. 10, 2013

(54) INFORMATION PROVIDING METHOD, HOME GATEWAY, AND HOME NETWORK SYSTEM

(75) Inventors: Guofeng Qian, Beijing (CN); Shuxiang Wang, Beijing (CN); Zhiwang Zhao, Beijing (CN); Huihuang Chen, Frankfurt (DE); Jin Qiu, Beijing (CN); Lei Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 13/338,498

(22) Filed: Dec. 28, 2011

(65) Prior Publication Data

US 2012/0102213 A1    Apr. 26, 2012

Related U.S. Application Data

(63) Continuation of application No. PCT/CN2011/075183, filed on Jun. 2, 2011.

(30) Foreign Application Priority Data

Oct. 8, 2010    (CN) .......................... 2010 1 0505365

(51) Int. Cl.
   *G06F 15/16*    (2006.01)
(52) U.S. Cl.
   USPC ......................................................... 709/228
(58) Field of Classification Search
   USPC .................. 709/223, 227–228, 230
   See application file for complete search history.

(56) References Cited

U.S. PATENT DOCUMENTS

| 7,729,312 | B2 | 6/2010 | Suzuki et al. | |
|---|---|---|---|---|
| 2001/0032265 | A1 | 10/2001 | Tanaka | |
| 2006/0168270 | A1* | 7/2006 | Townsley et al. | 709/230 |
| 2006/0253530 | A1* | 11/2006 | Wu et al. | 709/204 |
| 2008/0320115 | A1* | 12/2008 | Ding | 709/220 |
| 2010/0169921 | A1* | 7/2010 | Vare et al. | 725/39 |
| 2011/0004674 | A1* | 1/2011 | Zheng | 709/220 |
| 2012/0042058 | A1* | 2/2012 | Shaikh et al. | 709/222 |
| 2012/0210166 | A1* | 8/2012 | Bonefas et al. | 714/18 |

FOREIGN PATENT DOCUMENTS

| CN | 101753635 A | 6/2010 |
|---|---|---|
| CN | 101765232 A | 6/2010 |
| EP | 2 383 934 A1 | 11/2011 |

(Continued)

OTHER PUBLICATIONS

International Search Report dated Sep. 8, 2011 in connection with International Patent Application No. PCT/CN2011/075183.

(Continued)

*Primary Examiner* — Jason Recek

(57) ABSTRACT

Embodiments of the present invention provide an information providing method, a home gateway, and a home network system. The method includes: obtaining an IPv6 address or an IPv6 prefix of a client and a service type of the client; establishing a mapping between the IPv6 address or the IPv6 prefix of the client and the service type of the client; sending the mapping between the IPv6 address or the IPv6 prefix of the client and the service type of the client to a Broadband Remote Access Server (BRAS), so that the BRAS dispatches and manages a service of the client according to the mapping between the IPv6 address or the IPv6 prefix of the client and the service type of the client.

9 Claims, 2 Drawing Sheets

(56) References Cited

FOREIGN PATENT DOCUMENTS

| JP | 2001298481 A | 10/2001 |
|---|---|---|
| WO | WO 2007/125430 A2 | 11/2007 |
| WO | WO 2008/038862 A1 | 4/2008 |
| WO | WO 2010/083739 A1 | 7/2010 |
| WO | WO 2010/098705 A1 | 9/2010 |

OTHER PUBLICATIONS

O. Troan, et al., "IPv6 Prefix Options for Dynamic Host Configuration Protocol (DHCP) version 6", Network Working Group, Dec. 2003, 19 pages.

J. Bound, et al., "Dynamic Host Configuration Protocol for IPv6 (DHCPv6)", Jul. 2003, 194 pages.

Supplementary European Search Report dated Jan. 2, 2013 in connection with European Patent Application No. EP 11 78 3069.

"Home Gateway Technical Requirements: Residential Profile", HGI, Home Gateway Initiative, Apr. 29, 2008, 125 pages.

"HGI-GD013-R2, HGI Guideline Document: QoS white paper", HGI, Home Gateway Initiative, Jun. 26, 2009, 31 pages.

Partial translation of the Written Opinion of the International Searching Authority dated Sep. 8, 2011 in connection with International Patent Application No. PCT/CN2011/075183.

Notice to Submit a Response dated Jun. 14, 2013 in connection with Korean Patent Application No. 10-2012-7001053.

Notice of Reasons for Rejection dated Jul. 16, 2013 in connection with Japanese Patent Application No. 2012-521957.

* cited by examiner

| Option -code | Option -len | Option-data | Option -code | Option -len | Option-data |

| Option- code | Option- len | Option-data |

INFORMATION PROVIDING METHOD, HOME GATEWAY, AND HOME NETWORK SYSTEM

CROSS-REFERENCE TO RELATED APPLICATIONS

This application is a continuation of International Application No. PCT/CN2011/075183, filed on Jun. 2, 2011, which claims priority to Chinese Patent Application No. 201010505365.1, filed on Oct. 8, 2010, both of which are hereby incorporated by reference in their entireties.

FIELD OF THE INVENTION

The present invention relates to the field of technologies, and in particular, to an information providing method, a home gateway, and a home network system.

BACKGROUND OF THE INVENTION

In an existing telecommunication network, home management demands exist, for example, it is required to manage specific services of a home network on a Broadband Remote Access Server (BRAS), so as to provide differentiated types of control, including bandwidth control and right control, based on different services.

In an Internet Protocol version 6 (IPv6) home network system, the client may be connected to the BRAS through a home gateway (Customer Premise Equipment (CPE)), where the client may include terminals at home, for example, terminals providing services, such as Voice over IP (VoIP), IP Television (IPTV), and High Speed Internet (HSI). In the IPv6 home network system, the CPE applies to the BRAS for a network segment of a home network, and then a terminal providing a specific service in the home network system applies to the CPE for a specific address in the network segment.

During the implementation of the present invention, the inventor finds that the prior art has at least the following problems. In the existing IPv6 home network, the procedure of allocating the specific address to the client is invisible to the BRAS. Therefore, the BRAS cannot sense the service type required by the client, for example, VoIP, IPTV, and HSI, so that the BRAS cannot dispatch and manage different services of the client, thereby affecting normal operation of the service of the client.

SUMMARY OF THE INVENTION

Embodiments of the present invention provide an information providing method, a home gateway, and a home network system, so that a BRAS may dispatch and manage different services of a client, so as to ensure normal operation of the service of the client.

An embodiment of the present invention provides an information providing method, including:
 obtaining an IPv6 address or an IPv6 prefix of a client and a service type of the client;
 establishing a mapping between the IPv6 address or the IPv6 prefix of the client and the service type of the client;
 sending the mapping between the IPv6 address or the IPv6 prefix of the client and the service type of the client to a BRAS, so that the BRAS dispatches and manages a service of the client according to the mapping between the IPv6 address or the IPv6 prefix of the client and the service type of the client.

An embodiment of the present invention provides a home gateway, including:
 an obtaining module, configured to obtain an IPv6 address or an IPv6 prefix of a client and a service type of the client;
 an establishing module, configured to establish a mapping between the IPv6 address or the IPv6 prefix of the client and the service type of the client; and
 a providing module, configured to send the mapping between the IPv6 address or the IPv6 prefix of the client and the service type of the client to a BRAS, so that the BRAS dispatches and manages a service of the client according to the mapping between the IPv6 address or the IPv6 prefix of the client and the service type of the client.

An embodiment of the present invention provides a home network system, including a home gateway and a BRAS, where
 the home gateway is configured to obtain an IPv6 address or an IPv6 prefix of a client and a service type of the client, establish a mapping between the IPv6 address or the IPv6 prefix of the client and the service type of the client, and send the mapping between the IPv6 address or the IPv6 prefix of the client and the service type of the client to the BRAS; and
 the BRAS is configured to obtain the mapping, which is between the IPv6 address or the IPv6 prefix of the client and the service type of the client and is sent by the home gateway, and dispatch and manage a service of the client according to the mapping.

It may be known from the technical solutions that in the embodiments of the present invention, the mappling established between the IPv6 address or the IPv6 prefix of the client and the service type of the client is sent to the BRAS by the home gateway, so that the BRAS may dispatch and manage the service of the client according to the mapping, for example, the BRAS may perform differentiated dispatch on the service of the corresponding client according to the service type; the BRAS may allocate a bandwidth to the corresponding client according to the service type, or set different access rights for the corresponding clients. Therefore, the BRAS may dispatch and manage different services of the client, thereby ensuring normal operation of the service of the client.

BRIEF DESCRIPTION OF THE DRAWINGS

To illustrate the technical solutions according to the embodiments of the present invention or in the prior art more clearly, the accompanying figures for describing the embodiments or the prior art are introduced briefly in the following. Apparently, the accompanying drawings in the following description are only some embodiments of the present invention; persons of ordinary skill in the art may obtain other drawings according to the accompanying drawings without any creative efforts.

DETAILED DESCRIPTION OF THE EMBODIMENTS

In order to make the objectives, technical solutions, and advantages of the present invention more comprehensible, the technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
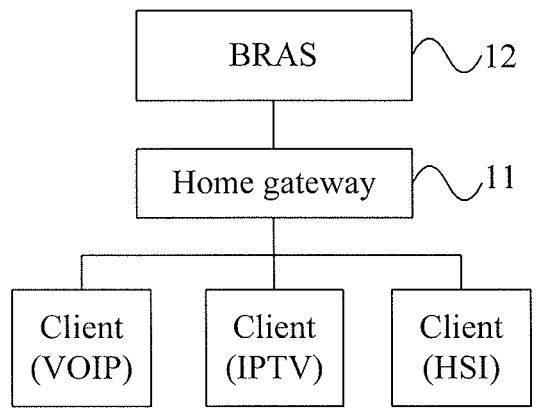
FIG. 1 is a schematic structural diagram of a home network system according to an embodiment of the present invention.

FIG. 1 is a schematic structural diagram of a home network system according to an embodiment of the present invention. As shown in FIG. 1, the home network system of this embodiment may include a home gateway 11 and a BRAS 12.

The home gateway 11 is configured to obtain an IPv6 address or an IPv6 prefix of a client and a service type of the client, establish a mapping between the IPv6 address or the IPv6 prefix of the client and the service type of the client, and send the mapping between the IPv6 address or the IPv6 prefix of the client and the service type of the client to the BRAS 12.

The BRAS 12 is configured to obtain the mapping, which is between the IPv6 address or the IPv6 prefix of the client and the service type of the client and is sent by the home gateway 11, and dispatches and manages a service of the client according to the mapping.

Specifically, the home gateway 11 may carry the mapping between the IPv6 address or the IPv6 prefix of the client and the service type of the client through an extended DHCPv6 protocol message, and send the extended DHCPv6 protocol message to the BRAS 12.

In this embodiment, the client may include terminals at home, for example, terminals providing services, such as VoIP, IPTV, and HSI.

In this embodiment, the mapping established between the IPv6 address or the IPv6 prefix of the client and the service type of the client is sent to the BRAS by the home gateway, so that the BRAS may dispatch and manage the service of the client according to the mapping, for example, the BRAS may perform differentiated dispatch on the service of the corresponding client according to the service type; the BRAS may allocate a bandwidth to the corresponding client according to the service type, or set different access rights for the corresponding clients. Therefore, the BRAS may dispatch and manage different services of the client, thereby ensuring normal operation of the service of the client.

Figure 2:
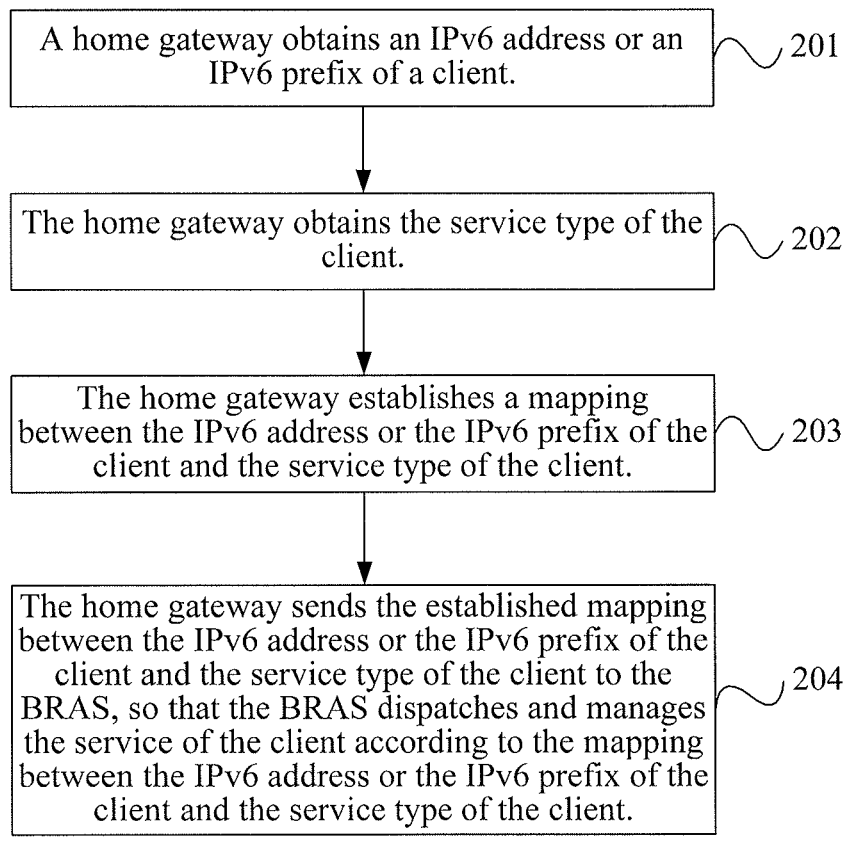
FIG. 2 is a schematic flow chart of an information providing method according to an embodiment of the present invention.

FIG. 2 is a schematic flow chart of an information providing method according to an embodiment of the present invention. As shown in FIG. 2, the information providing method of this embodiment may include the following steps.

Step 201: A home gateway obtains an IPv6 address or an IPv6 prefix of a client.

The home gateway may apply to a BRAS by using a DHCPv6, and then the BRAS allocates the IPv6 address or the IPv6 prefix to the home gateway. The client may obtain the IPv6 address or the IPv6 prefix through three manners, in a first manner, the client applies to the home gateway by using the DHCPv6, and then the home gateway performs allocation for the client according to the IPv6 address or the IPv6 prefix obtained by the home gateway; in a second manner, the client applies to the home gateway by using a Neighbor Discover (ND) protocol, and then the home gateway performs allocation for the client according to the IPv6 address or the IPv6 prefix obtained by the home gateway; in a third manner, according to the IPv6 address or the IPv6 prefix of the home gateway, the client is statically configured.

Specifically, the manner of obtaining the IPv6 address or the IPv6 prefix of the client by the home gateway may be, but is not limited to, the following manners.

A. The IPv6 address or the IPv6 prefix of the client is obtained by allocating the IPv6 address or the IPv6 prefix of the client to the client.

B. The IPv6 address or the IPv6 prefix of the client is obtained through the IPv6 address or the IPv6 prefix of the client in a packet of the client.

Step 202: The home gateway obtains the service type of the client.

Specifically, the manner of obtaining the service type of the client by the home gateway may be, but is not limited to, the following manners.

A. The service type of the client is obtained through an access port used by the client.

Specifically, different clients access the network system through the home gateway, and different access ports of the home gateway correspond to different service, so that the home gateway may obtain the service type of the client through the access port used by the client.

B. The service type of the client is obtained through an option in a request message when the client applies for the IPv6 address or the IPv6 prefix.

Specifically, the client may send a DHCPv6 request message or an ND request message to the home gateway, where the request message may include a service type identifier (ID) of the client, so that the home gateway may obtain the service type of the client through the request message from the client.

C. The service type of the client is obtained through a service type attribute included in the packet of the client.

Specifically, the client may send a service packet to the home gateway, where the service packet may include the service type ID of the client, so that the home gateway may obtain the service type of the client through the service packet from the client.

In this embodiment, the client may include terminals at home, for example, terminals providing services, such as VoIP, IPTV, and HSI.

It should be noted that step 201 and step 202 does not have a precedence order.

Step 203: The home gateway establishes a mapping between the IPv6 address or the IPv6 prefix of the client and the service type of the client.

The service type of the client may be represented by an appointed ID, for example, a special separator or an appointed string, so that the mapping between the IPv6 address or the IPv6 prefix of the client and the service type of the client may be the mapping between the IPv6 address or the IPv6 prefix of the client and the service type ID of the client.

Step 204: The home gateway sends the mappling established between the IPv6 address or the IPv6 prefix of the client and the service type of the client to the BRAS, so that the BRAS dispatches and manages a service of the client according to the mapping between the IPv6 address or the IPv6 prefix of the client and the service type of the client.

Figures 3, 4, 5:
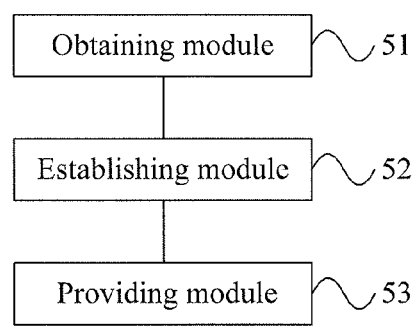
FIG. 3 is a schematic diagram of two added Dynamic Host Configuration Protocol for IPv6 (DHCPv6) options in the information providing method according to an embodiment of the present invention.
FIG. 4 is a schematic diagram of an added DHCPv6 option in the information providing method according to an embodiment of the present invention.
FIG. 5 is a schematic structural diagram of a home gateway according to an embodiment of the present invention.

Specifically, the home gateway may send the mapping between the IPv6 address or the IPv6 prefix of the client and the service type of the client to the BRAS through the DHCPv6 protocol, for example, the home gateway may send the mapping between the IPv6 address or the IPv6 prefix of the client and the service type of the client to the BRAS by adding a new DHCPv6 option in a DHCPv6 protocol message with an msg-type being renew. Specifically, the process may be:

Two DHCPv6 options in the DHCPv6 protocol message are added. As shown in FIG. 3, a DHCPv6 option carries the IPv6 address or the IPv6 prefix of the client (Option-code: a newest ID to be allocated, Option-len: 0-128 bits; Option-data: an IPv6 address or IPv6 prefix), the other DHCPv6 option carries the service type ID of the client (Option-code: the newest ID to be allocated; Option-len: not requested; Option-data: a service type ID (for example, an ID or string)).

A DHCPv6 option in the DHCPv6 protocol message is added. As shown in FIG. 4, the DHCPv6 option carries the IPv6 address or the IPv6 prefix of the client and the service type ID of the client (Option-code: the newest ID to be allocated; Option-len: not requested; Option-data: an IPv6 address or IPv6 prefix (0-128 bits)+a service type ID (for example, an ID or string)).

Alternatively, the home gateway may send the mapping between the IPv6 address or the IPv6 prefix of the client and the service type ID of the client to the BRAS through any other IP-based protocol, for example, Access Node Control Protocol (ANCP), Point-to-Point Protocol (PPP), which is not limited by the embodiments of the present invention.

In this embodiment, the mapping established between the IPv6 address or the IPv6 prefix of the client and the service type of the client is sent to the BRAS by the home gateway, so that the BRAS may dispatch and manage the service of the client according to the mapping, for example, the BRAS may perform differentiated dispatch on the service of the corresponding client according to the service type; the BRAS may allocate a bandwidth to the corresponding client according to the service type, or sets different access rights for the corresponding clients. Therefore, the BRAS may dispatch and manage different services of the client, thereby ensuring normal operation of the service of the client.

It should be noted that, for ease of description, the methods according to the embodiments hereinbefore are all described as a combination of a series of actions, but persons skilled in the art should know that, according to the present invention, some steps may be performed in other sequences or simultaneously, and the present invention is not limited to the described action sequence. Next, persons skilled in the art should also know that, the embodiments described in the specification all fall within exemplary embodiments, and the related actions and modules are not necessarily required by the present invention.

In the forgoing embodiments, description for the embodiments has its own emphasis, and a part without being described in detail in a certain embodiment may be obtained with reference to relevant description in other embodiments.

FIG. 5 is a schematic structural diagram of a home gateway according to an embodiment of the present invention. As shown in FIG. 5, the home gateway of this embodiment may include an obtaining module 51, an establishing module 52, and a providing module 53. The obtaining module 51 is configured to obtain an IPv6 address or an IPv6 prefix of a client and a service type of the client. The establishing module 52 is configured to establish a mapping between the IPv6 address or the IPv6 prefix of the client and the service type of the client. The providing module 53 is configured to send the mapping between the IPv6 address or the IPv6 prefix of the client and the service type of the client to a BRAS, so that the BRAS dispatches and manages a service of the client according to the mapping between the IPv6 address or the IPv6 prefix of the client and the service type of the client.

Functions of the home gateway 11 in the home network system according to the embodiment corresponding to FIG. 1 and the home gateway in the information providing method according to the embodiment corresponding to FIG. 2 may all be implemented by the home gateway according to the embodiment of the present invention.

Specifically, the providing module 53 may carry the mapping between the IPv6 address or the IPv6 prefix of the client and the service type of the client through an extended DHCPv6 protocol message, and send the extended DHCPv6 protocol message to the BRAS. Specifically, the providing module 53 may respectively carry the IPv6 address or the IPv6 prefix of the client and carry the service type of the client by adding two DHCPv6 options in the DHCPv6 protocol message, and send the extended DHCPv6 protocol message to the BRAS; or the providing module 53 may carry the IPv6 address of the client and the service type of the client by adding a DHCPv6 option in the DHCPv6 protocol message, and send the extended DHCPv6 protocol message to the BRAS.

In this embodiment, the mapping between the IPv6 address or the IPv6 prefix of the client and the service type of the client established by the establishing module is sent to the BRAS by the providing module, so that the BRAS may dispatch and manage the service of the client according to the mapping, for example, the BRAS may perform differentiated dispatch on the service of the corresponding client according to the service type; the BRAS may allocate a bandwidth to the corresponding client according to the service type, or sets different access rights for the corresponding clients. Therefore, the BRAS may dispatch and manage different services of the client, thereby ensuring normal operation of the service of the client.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (ROM), a Random Access Memory (RAM), a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications may be made to the technical solutions described in the embodiments, or equivalent replacements may be made to some technical features in the technical solutions, as long as such modifications or replacements do not depart from the spirit and scope of the present invention.

What is claimed is:

1. An information providing method, comprising:
   obtaining an Internet Protocol version 6 (IPv6) address or an IPv6 prefix of a client and a service type of the client;
   establishing a mapping between the IPv6 address or the IPv6 prefix of the client and the service type of the client;
   sending the mapping between the IPv6 address or the IPv6 prefix of the client and the service type of the client to a Broadband Remote Access Server (BRAS), so that the BRAS dispatches and manages a service of the client according to the mapping between the IPv6 address or the IPv6 prefix of the client and the service type of the client;

wherein the sending the mapping between the IPv6 address or the IPv6 prefix of the client and the service type of the client to the BRAS comprises:

carrying the mapping between the IPv6 address or the IPv6 prefix of the client and the service type of the client through an extended Dynamic Host Configuration Protocol for IPv6 (DHCPv6) protocol message, and sending the extended DHCPv6 protocol message to the BRAS; and wherein carrying the mapping between the IPv6 address or the IPv6 prefix of the client and the service type of the client through an extended DHCPv6 protocol message comprises:

respectively carrying the IPv6 address or the IPv6 prefix of the client and carrying the service type of the client by adding two DHCPv6 options in the DHCPv6 protocol message, or carrying the IPv6 address of the client and the service type of the client by adding a DHCPv6 option in the DHCPv6 protocol message.

2. The method according to claim 1, wherein the obtaining the IPv6 address or the IPv6 prefix of the client comprises:

obtaining the IPv6 address or the IPv6 prefix of the client by allocating the IPv6 address or the IPv6 prefix of the client to the client; or obtaining the IPv6 address or the IPv6 prefix of the client through the IPv6 address or the IPv6 prefix of the client comprised in a packet of the client.

3. The method according to claim 1, wherein the obtaining the service type of the client comprises:

obtaining the service type of the client through an access port used by the client; or obtaining the service type of the client through an option in a request message when the client applies for the IPv6 address or the IPv6 prefix; or obtaining the service type of the client through a service type attribute in a packet of the client.

4. The method according to claim 1, wherein obtaining the IPv6 address or the IPv6 prefix of the client comprises:

obtaining the IPv6 address or the IPv6 prefix of the client by allocating the IPv6 address or the IPv6 prefix of the client to the client; or obtaining the IPv6 address or the IPv6 prefix of the client through the IPv6 address or the IPv6 prefix of the client comprised in a packet of the client.

5. The method according to claim 1, wherein the obtaining the service type of the client comprises:

obtaining the service type of the client through an access port used by the client; or obtaining the service type of the client through an option in a request message when the client applies for the IPv6 address or the IPv6 prefix; or obtaining the service type of the client through a service type attribute in a packet of the client.

6. A home gateway, comprising:

an obtaining module, configured to obtain an Internet Protocol version 6 (IPv6) address or an IPv6 prefix of a client and a service type of the client;

an establishing module, configured to establish a mapping between the IPv6 address or the IPv6 prefix of the client and the service type of the client; and a providing module, configured to send the mapping between the IPv6 address or the IPv6 prefix of the client and the service type of the client to a Broadband Remote Access Server (BRAS), so that the BRAS dispatches and manages a service of the client according to the mapping between the IPv6 address or the IPv6 prefix of the client and the service type of the client;

wherein when the providing module is configured to send the mapping between the IPv6 address or the IPv6 prefix of the client and the service type of the client to the BRAS:

the providing module is configured to carry the mapping between the IPv6 address or the IPv6 prefix of the client and the service type of the client through an extended Dynamic Host Configuration Protocol for IPv6 (DHCPv6) protocol message, and send the extended DHCPv6 protocol message to the BRAS; and wherein when the providing module is configured to carry the mapping between the IPv6 address or the IPv6 prefix of the client and the service type of the client through the extended DHCPv6 protocol message:

the providing module is configured to respectively carry the IPv6 address or the IPv6 prefix of the client and carry the service type of the client by adding two DHCPv6 options in the DHCPv6 protocol message, and send the extended DHCPv6 protocol message to the BRAS, or the providing module is configured to carry the IPv6 address of the client and the service type of the client by adding a DHCPv6 option in the DHCPv6 protocol message, and send the extended DHCPv6 protocol message to the BRAS.

7. A home network system, comprising a home gateway and a Broadband Remote Access Server (BRAS), wherein the home gateway is configured to obtain an Internet Protocol version 6 (IPv6) address or an IPv6 prefix of a client and a service type of the client, establish a mapping between the IPv6 address or the IPv6 prefix of the client and the service type of the client, and send the mapping between the IPv6 address or the IPv6 prefix of the client and the service type of the client to the BRAS; and the BRAS is configured to obtain the mapping between the IPv6 address or the IPv6 prefix of the client and the service type of the client sent by the home gateway, and dispatch and manage a service of the client according to the mapping;

wherein when the home gateway is configured to send the mapping between the IPv6 address or the IPv6 prefix of the client and the service type of the client to the BRAS, the home gateway is configured to carry the mapping between the IPv6 address or the IPv6 prefix of the client and the service type of the client through an extended Dynamic Host Configuration Protocol for IPv6 (DHCPv6) protocol message, and send the extended DHCPv6 protocol message to the BRAS; and wherein when the home gateway is configured to carry the mapping between the IPv6 address or the IPv6 prefix of the client and the service type of the client through the extended DHCPv6 protocol message, the home gateway is configured to respectively carry the IPv6 address or the IPv6 prefix of the client and carry the service type of the client by adding two DHCPv6 options in the DHCPv6 protocol message, and send the extended DHCPv6 protocol message to the BRAS, or the home gateway is configured to carry the IPv6 address of the client and the service type of the client by adding a DHCPv6 option in the DHCPv6 protocol message, and send the extended DHCPv6 protocol message to the BRAS.

8. An information providing method, comprising:
obtaining an Internet Protocol version 6 (IPv6) address or an IPv6 prefix of a client and a service type of the client;
establishing a mapping between the IPv6 address or the IPv6 prefix of the client and the service type of the client;
sending the mapping between the IPv6 address or the IPv6 prefix of the client and the service type of the client to a Broadband Remote Access Server (BRAS), so that the BRAS dispatches and manages a service of the client according to the mapping between the IPv6 address or the IPv6 prefix of the client and the service type of the client;
wherein sending the mapping between the IPv6 address or the IPv6 prefix of the client and the service type of the client to the BRAS comprises:
carrying the mapping between the IPv6 address or the IPv6 prefix of the client and the service type of the client through an extended Dynamic Host Configuration Protocol for IPv6 (DHCPv6) protocol message, and sending the extended DHCPv6 protocol message to the BRAS; and
wherein obtaining the IPv6 address or the IPv6 prefix of the client comprises:
obtaining the IPv6 address or the IPv6 prefix of the client by allocating the IPv6 address or the IPv6 prefix of the client to the client, or
obtaining the IPv6 address or the IPv6 prefix of the client through the IPv6 address or the IPv6 prefix of the client comprised in a packet of the client.

9. An information providing method, comprising:
obtaining an Internet Protocol version 6 (IPv6) address or an IPv6 prefix of a client and a service type of the client;
establishing a mapping between the IPv6 address or the IPv6 prefix of the client and the service type of the client;
sending the mapping between the IPv6 address or the IPv6 prefix of the client and the service type of the client to a Broadband Remote Access Server (BRAS), so that the BRAS dispatches and manages a service of the client according to the mapping between the IPv6 address or the IPv6 prefix of the client and the service type of the client;
wherein the sending the mapping between the IPv6 address or the IPv6 prefix of the client and the service type of the client to the BRAS comprises:
carrying the mapping between the IPv6 address or the IPv6 prefix of the client and the service type of the client through an extended Dynamic Host Configuration Protocol for IPv6 (DHCPv6) protocol message, and sending the extended DHCPv6 protocol message to the BRAS; and
wherein the obtaining the service type of the client comprises:
obtaining the service type of the client through an access port used by the client, or
obtaining the service type of the client through an option in a request message when the client applies for the IPv6 address or the IPv6 prefix, or
obtaining the service type of the client through a service type attribute in a packet of the client.

* * * * *

UNITED STATES PATENT AND TRADEMARK OFFICE
CERTIFICATE OF CORRECTION

| | |
|---|---|
| PATENT NO. | : 8,606,937 B2 |
| APPLICATION NO. | : 13/338498 |
| DATED | : December 10, 2013 |
| INVENTOR(S) | : Guofeng Qian et al. |

Page 1 of 1

It is certified that error appears in the above-identified patent and that said Letters Patent is hereby corrected as shown below:

Claims

Column 7, Claim 2, line 24, after "wherein" delete "the";

Column 7, Claim 3, line 32, after "wherein" delete "the"; and

Column 8, Claim 7, line 42, delete "and".

Signed and Sealed this
Sixteenth Day of February, 2016

Michelle K. Lee
*Director of the United States Patent and Trademark Office*